United States Patent [19]
Kobayashi et al.

[11] Patent Number: 5,524,163
[45] Date of Patent: Jun. 4, 1996

[54] APPARATUS FOR SPLICING OPTICAL FIBERS AND METHOD FOR THE SAME

[75] Inventors: Mikio Kobayashi, Yokohama; Shikou Kodama, Kobe, both of Japan

[73] Assignee: Sumitomo Electric Industries, Ltd., Japan

[21] Appl. No.: 366,543

[22] Filed: Dec. 29, 1994

[51] Int. Cl.⁶ .................................................. G02B 6/255
[52] U.S. Cl. .......................... 385/96; 219/121.45; 385/98
[58] Field of Search ................................. 385/95–99, 134, 385/135, 147; 219/121.11, 121.45, 121.46, 121.54

[56] References Cited

U.S. PATENT DOCUMENTS

| | | | |
|---|---|---|---|
| 4,506,947 | 3/1985 | Tatekura et al. | 385/97 |
| 4,690,493 | 9/1987 | Khoe | 385/96 X |
| 4,914,797 | 4/1990 | Tsuchida et al. | 385/96 X |
| 5,002,351 | 3/1991 | Szanto et al. | 385/96 |
| 5,011,259 | 4/1991 | Lieber et al. | 385/97 X |
| 5,218,184 | 6/1993 | Hakoun et al. | 385/97 X |

FOREIGN PATENT DOCUMENTS

| | | |
|---|---|---|
| 0237426 | 9/1987 | European Pat. Off. . |
| 0400408 | 12/1990 | European Pat. Off. . |
| 0494809 | 7/1992 | European Pat. Off. . |
| 3335579 | 4/1985 | Germany . |
| 3538563 | 5/1987 | Germany . |
| 60-49307 | 3/1985 | Japan . |
| 5-34646 | 5/1993 | Japan . |

*Primary Examiner*—John D. Lee
*Attorney, Agent, or Firm*—Cushman Darby & Cushman

[57] ABSTRACT

This apparatus comprises: (a) a housing; (b) a first microscope placed in said housing to observe optical fibers; (c) a first light source facing to said first microscope; (d) a second microscope placed in said housing to observe said optical fibers; (e) a second light source facing to said second microscope; (f) a third microscope placed in said housing to observe said optical fibers; and (g) a third light source facing to said third microscope. When the first light source is turned on, the first light emitted from the first light source irradiates the optical fibers. When the second light source is turned on, the second light emitted from the second light source irradiates the optical fibers when the first light source is turned on, enlarged images of the fibers are observed, and when the second light source is turned on, enlarged images of the fibers are observed with said second microscope. These fibers are observed from different directions without moving these microscopes.

21 Claims, 14 Drawing Sheets

CROSS SECTION A-A

CROSS SECTION B-B

CROSS SECTION C-C

CROSS SECTION D-D

CROSS SECTION E-E

CROSS SECTION F-F

CROSS SECTION G-G

CROSS SECTION H-H

1

APPARATUS FOR SPLICING OPTICAL FIBERS AND METHOD FOR THE SAME

BACKGROUND OF THE INVENTION

1. Field of the Invention

The present invention relates to an apparatus for splicing optical fibers, and more particularity to an apparatus for melting optical fibers to splice the optical fibers.

2. Related Background Art

Optical fibers are transmission lines in which a core portion is embedded in a cladding member the refractive index of which is lower than that of the core portion. The cladding member and the core portion are both made of silica glass. They may be made of plastic.

The inventors of the present application have developed the apparatus for splicing optical fibers for many years.

SUMMARY OF THE INVENTION

The inventors of the present application developed a new optical fiber splicing apparatus. The present invention is for an apparatus for melting optical fibers to splice the optical fibers. This apparatus comprises:

(a) a housing;

(b) a first microscope placed in said housing to observe said optical fibers;

(c) a first light source facing to said first microscope;

(d) a second microscope placed in said housing to observe said optical fibers;

(e) a second light source facing to said second microscope;

(f) a third microscope placed in said housing to observe said optical fibers; and.

(g) a third light source facing to said third microscope.

When the first light source is turned on, the first light emitted from the first light source irradiates the optical fibers. The first light is transmitted in the optical fibers. The first light is transmitted in the optical fiber is transmitted in the first microscope. Accordingly, when the first light source is turned on, enlarged images of the fibers are observed from a first direction by looking through the first microscope.

When the second light source is turned on, the second light emitted from the second light source irradiates the optical fibers. The second light transmitted the optical fiber is transmitted in the second microscope. Accordingly, when the second light source is turned on, enlarged images of the fibers are observed from a second direction by looking through the second microscope.

The first direction is perpendicular to the second direction. In other words, the first direction and the second direction preferably make an angle of 90±30 degrees and more preferably 90 degrees. While the two fibers are being observed from the first direction, these fibers are moved to be aligned so that the axes of the cores of the fibers match. While the two fibers are being observed from the second direction, these fibers are moved to be aligned so that the axes of the cores of the fibers match.

The apparatus of the present invention comprises a first mirror and a second mirror placed in the housing. This apparatus further comprises an image sensor.

An optical axis of the first microscope and a normal of the first mirror make an angle of $\theta P1$. Let a point of intersection of the optical axis of the first microscope and the first mirror be "P". A line connecting between the point P and the image sensor, and the normal of the first mirror make an angle of $\theta P2$. The angle $\theta P1$ is equal to the angle $\theta P2$.

An optical axis of the second microscope and a normal of the second mirror make an angle of $\theta Q1$. Let a point of intersection of the optical axis of the second microscope and the second mirror be "Q". A line connecting between the point Q and the image sensor, and the normal of the second mirror make an angle of $\theta P2$. The angle $\theta Q1$ is equal to the angle $\theta Q2$.

The optical axis of the third microscope passes through the image sensor. There is a shutter provided between the third light source and the third microscope. When the first light source is turned on, the first light is incident on the first microscope and emerges towards the first mirror. The first light is reflected by the first mirror and is focused on the image sensor. At this point, the shutter is closed, which prevents the first light from being incident on the third microscope when the first light source is turned on.

When the second light source is turned on, the second light is incident on the second microscope and emerges towards the second mirror. The second light is reflected by the second mirror and focused on the image sensor.

When the third light source is turned on, the shutter is made to be opened. The third light is focused on the image sensor.

The present apparatus comprises an external housing for storing the housing. The splicing of the optical fibers is often performed outside. This apparatus comprises a battery case for storing a battery in the external housing.

A large number of workers drive cars to working areas when they splice the optical fibers. The workers would be in trouble if there is no power supply when they splice the optical fibers. The present apparatus comprises a terminal to which a cigarette adapter is connected for supplying power to the first light source, the second light source and the third light source.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

FIG. 11 is a view showing the component 11 to be attached to the holder 14. There are compression springs 18a, 18b interposed between the holder 14 and the component 11. There is an arm 19 attached to the holder 14. The arm 19 has a through hole 19a.

In FIG. 13, a side plate of the housing 21 is omitted. There are a first microscope 115, a second microscope 116, and a third microscope 117, arranged in the housing 21. There is a shutter 22a placed between the microscope 117 and the support member 1.

FIG. 16 is a view of the cross section H—H of the component shown in FIG. 15. There are plane mirrors 27a, 27b arranged in the housing 21. Beams 215b, 216b, 217b intersect at one point on the surface of the CCD image sensor. Since the cover member 23 is in contact with the switch SW1, the switch SW1 is ON.

DETAILED DESCRIPTION OF THE PREFERRED EMBODIMENTS

Figure 1:
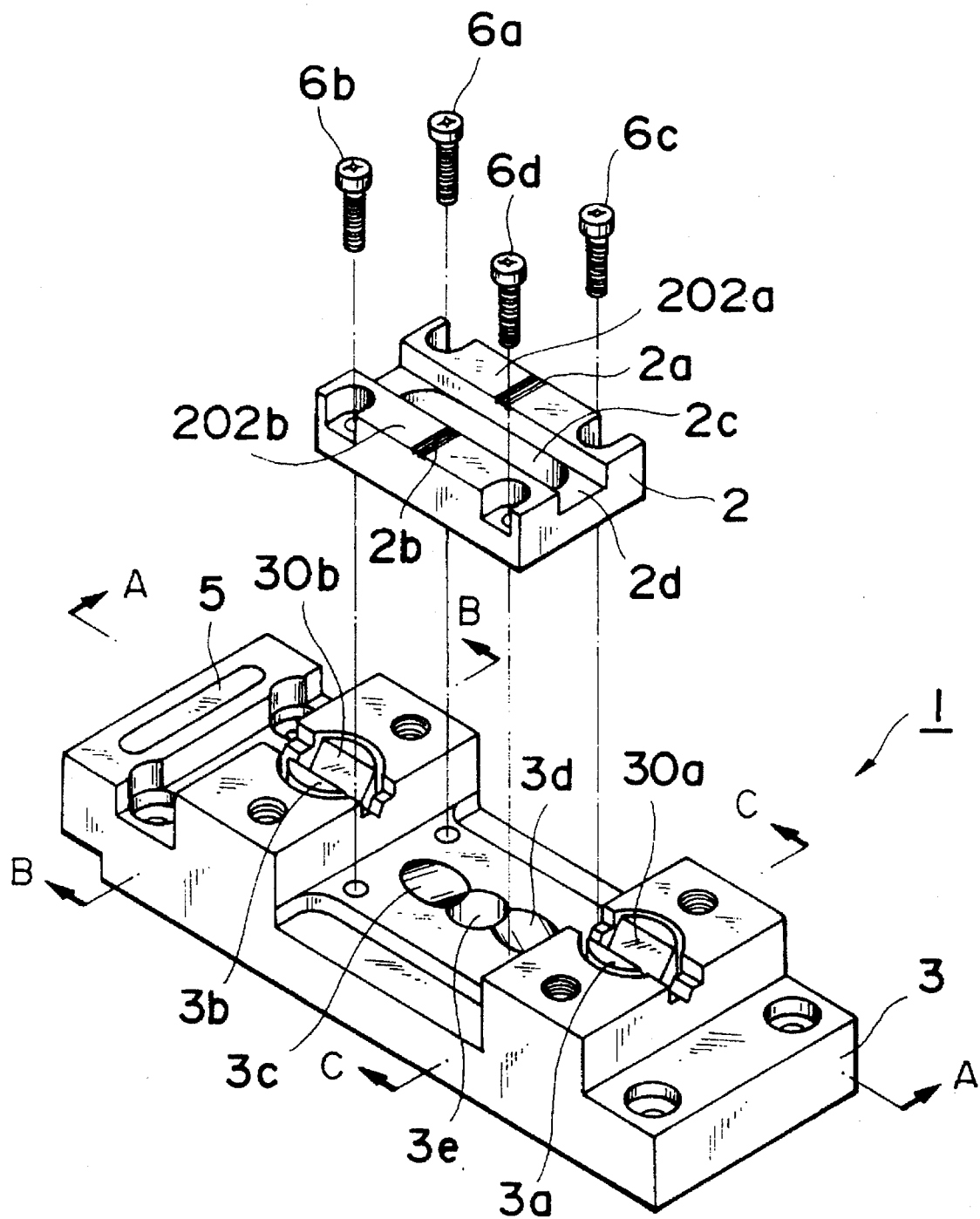
FIG. 1 is a perspective view showing a support member 1. The support member 1 comprises a fiber support member 2 for supporting a fiber, and an electrode support member 3 for supporting discharge electrodes 4 and 7 shown in FIG. 5. The fiber support member 2 has V-shaped grooves 2a and 2b on which fibers are to be provided, and a through hole 2c through which light passes. There is a magnet 5 attached to the electrode support member 3. There is a conductive member 3b for placing the discharge electrode 4, provided on the electrode support member 3. The conductive member 3b has a V-shaped groove 30b on which the discharge electrode is to be provided. The electrode support member 3 has through holes 3c, 3d, 3e through which light passes. The through hole 2c and through hole 3c are communicated each other. The fiber support member 2 is fixed on the electrode support member 3 with screws 6a, 6b, 6c, 6d.
Figure 2:
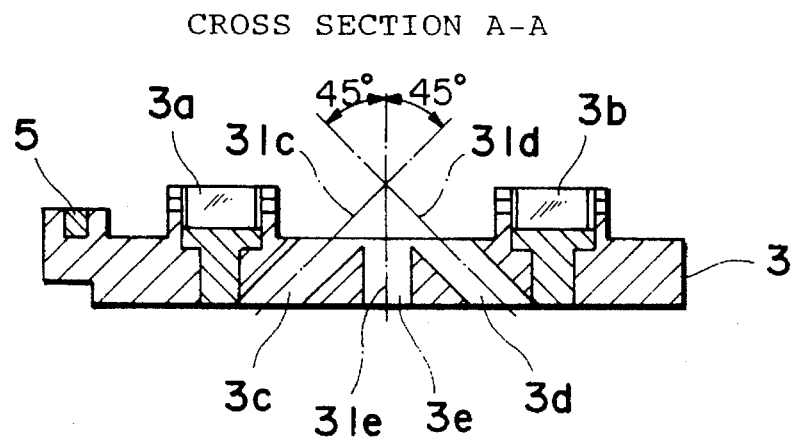
FIG. 2 is a view of the cross section A—A of the member shown in FIG. 1. A center line 31c of the through hole 3c is perpendicular to a center line 31d of the through hole 3d. A center line 31e of the through hole 3e and the center line 31c of the through hole 3c make an angle of 45 degrees. The center line 31e and the center line 31d make an angle of 45 degrees.
Figure 3:
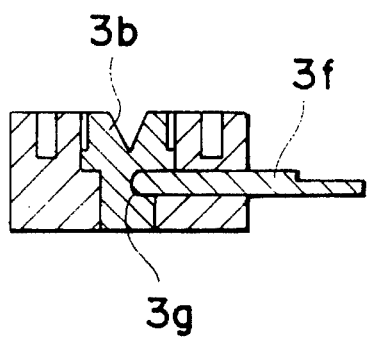
FIG. 3 is a view of the cross section B—B of the member shown in FIG. 1. The conductive member 3b has a hole 3g in which a lead wire (conductive rod) 3f is fitted.
Figure 4:
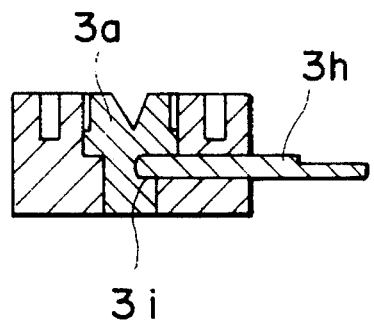
FIG. 4 is a view of the cross section C—C of the member shown in FIG. 1. There is a conductive member 3a having a hole 3i in which a lead wire (conductive rod) 3h is fitted. High voltage is applied between the lead wire 3h and the lead wire 3f.
Figure 5:
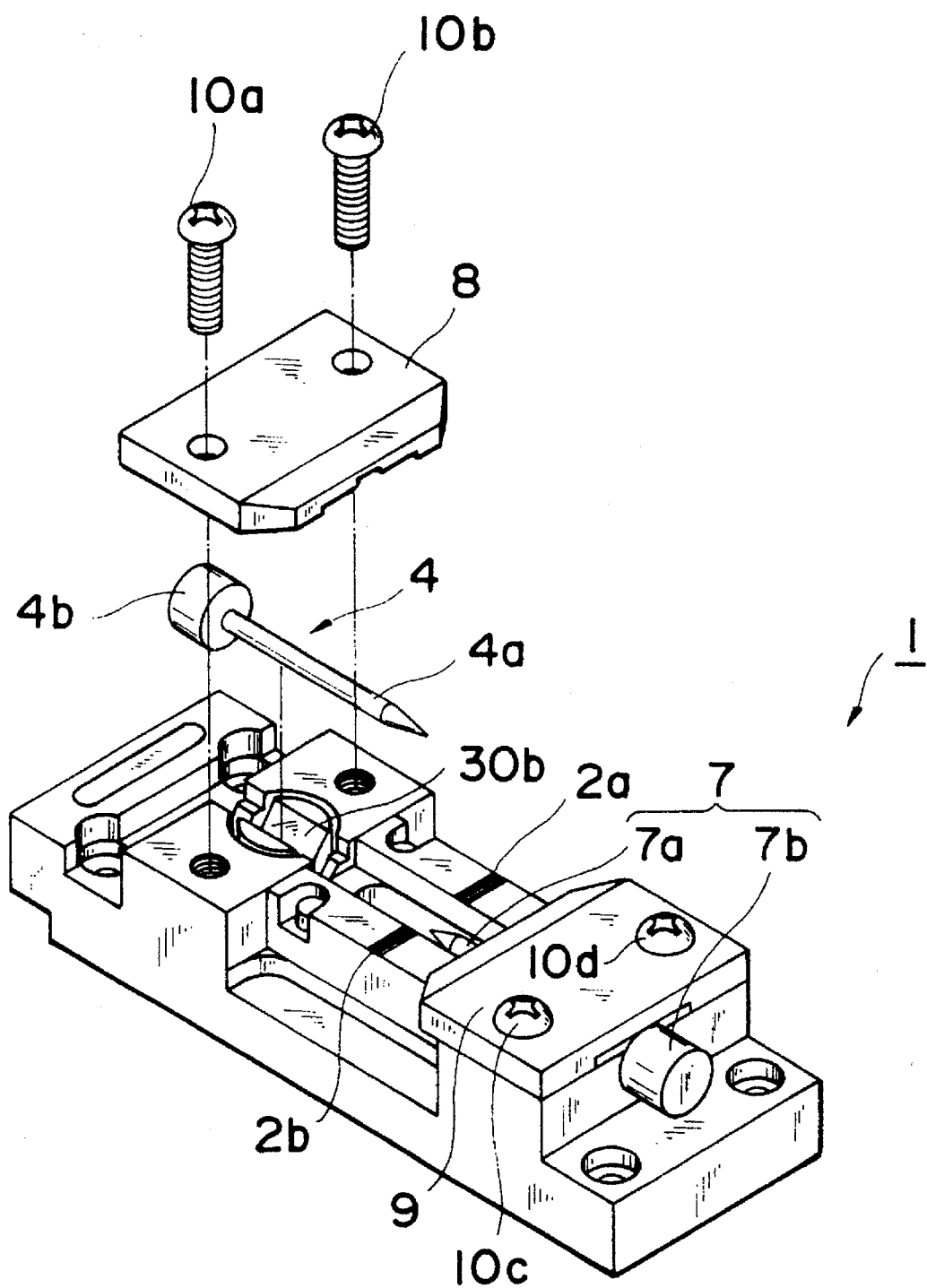
FIG. 5 shows the discharge electrodes 4, 7 to be placed in the support member 1 shown in FIG. 1. The discharge electrode 4 has a stopper 4b and a conductive pin 4a embedded in the stopper 4b. The tip of the conductive pin 4a is pointed. The discharge electrode 7 has a stopper 7b and a conductive pin 7a embedded in the stopper 7a. The tip of the conductive pin 7a is pointed. The conductive pin 4 is placed in the V-shaped groove 30b and pressed into the V-shaped groove 30b with a presser member 8. The conductive pin 7 is placed in the V-shaped groove 30a and pressed into the V-shaped groove 30a with a presser member 9. The presser member 8 is attached to the support member 3 with screws 10a, 10b. The presser member 9 is attached to the support member 3 with screws 10c, 10d.

The embodiments of the present invention will be described below. To assemble the present apparatus, first, a support member shown in FIG. 1 through FIG. 5 is prepared. The support member 1 comprises a fiber support member 2 for supporting a fiber, and an electrode support member 3 for supporting discharge electrodes 4, 7. The fiber support member 2 has V-shaped grooves 2a, 2b on which fibers are to be placed. The V-shaped groove 2a and the V-shaped groove 2b extend towards the same direction.

One optical fiber is placed in the V-shaped groove 2a. If the optical fiber is 125 μm in diameter, the V-shaped groove is about 125 μm in width. The V-shaped groove 2a is formed in a first surface 202a of the support member 2. The V-shaped groove 2b is formed in a second surface 202b of the support member 2. The first surface 202a and the second surface 202b are located on the same plane.

The support member 2 has a large groove 2d. The width of the large groove 2d is larger than the diameter of the discharge electrodes 4 and 7. A through hole 2C through which the light passes is formed in the center of the large groove 2d. Accordingly, when a first fiber and a second fiber (not shown) are placed in the V-shaped grooves 2a and 2b, respectively, one end of the first fiber and one end of the second fiber are faced each other above the large groove 2d. Since the discharge electrodes 4 and 7 are placed in the large groove 2d, the fibers are melted and spliced together by discharging between the discharge electrodes 4 and 7. The ends of the optical fibers are observed through the through hole 2c.

There is a magnet 5 attached to the electrode support member 3. There is a conductive member 3b attached to the electrode support member 3. The conductive member 3a has a V-shaped groove 30a. The discharge electrode 7 is to be placed in the V-shaped groove 30a. There is a conductive member 3b attached to the electrode support member 3. The conductive member 3b has a V-shaped groove 30b. The discharge electrode 4 is to be placed in the V-shaped groove 30b. The conductive member 3a is made of brass (conductor, metal). The electrode support member 3 is made of * (insulator, resin).

The electrode support member 3 has through holes 3c, 3d, 3e through which light passes. The through hole 2c and the through hole 3c are communicated each other. The fiber support member 2 is fixed on the electrode support member 3 with screws 6a, 6b, 6c, 6d.

A center line 31c of the through hole 3c is perpendicular to a center line 31d of the through hole 3d. A center line 31e of the through hole 3e and the center line 31c of the through hole 3c make an angle of 45 degrees. The center line 31e and the center line 31d make an angle of 45 degrees. The conductive member 3b has a hole 3g in which a lead wire (conductive rod) 3f is fitted. The conductive member 3a has a hole 3i in which a lead wire (conductive rod) 3h is fitted. High voltage (3 to 6 kV) is applied between the lead wire 3h and the lead wire 3f. The discharge electrode 4 has a stopper 4b, and a conductive pin 4a embedded in the stopper 4b. The discharge electrode 7 has a stopper 7b, and a conductive pin 7a embedded in the stopper 7b. When the high voltage is applied between the lead wire 3h and the lead wire 3f, the discharge is generated between the discharge electrode 4 and the discharge electrode 7. In other words, the discharge is generated between the tip of the conductive pin 4a and the tip of the conductive pin 7b. The first and second fibers, not shown, are melted and spliced together by this discharge.

The conductive pin 4 is placed in the V-shaped groove 30b and pressed into the V-shaped groove 30b with a presser member 8. The conductive pin 7 is placed in the V-shaped groove 30a and pressed into the V-shaped groove 30a with a presser member 9. The presser member 8 is fixed on the support member 3 with screws 10a and 10b. The presser member 9 is fixed on the presser member 9 with screws 10c and 10d.

As mentioned before, the first fiber, not shown, is placed in the V-shaped groove 2a, and the second fiber, not shown, is placed in the V-shaped groove 2b. These fibers are pressed into the V-shaped grooves 2a and 2b with a presser member 11 to be provided on the V-shaped grooves 2a and 2b.

Figure 6:
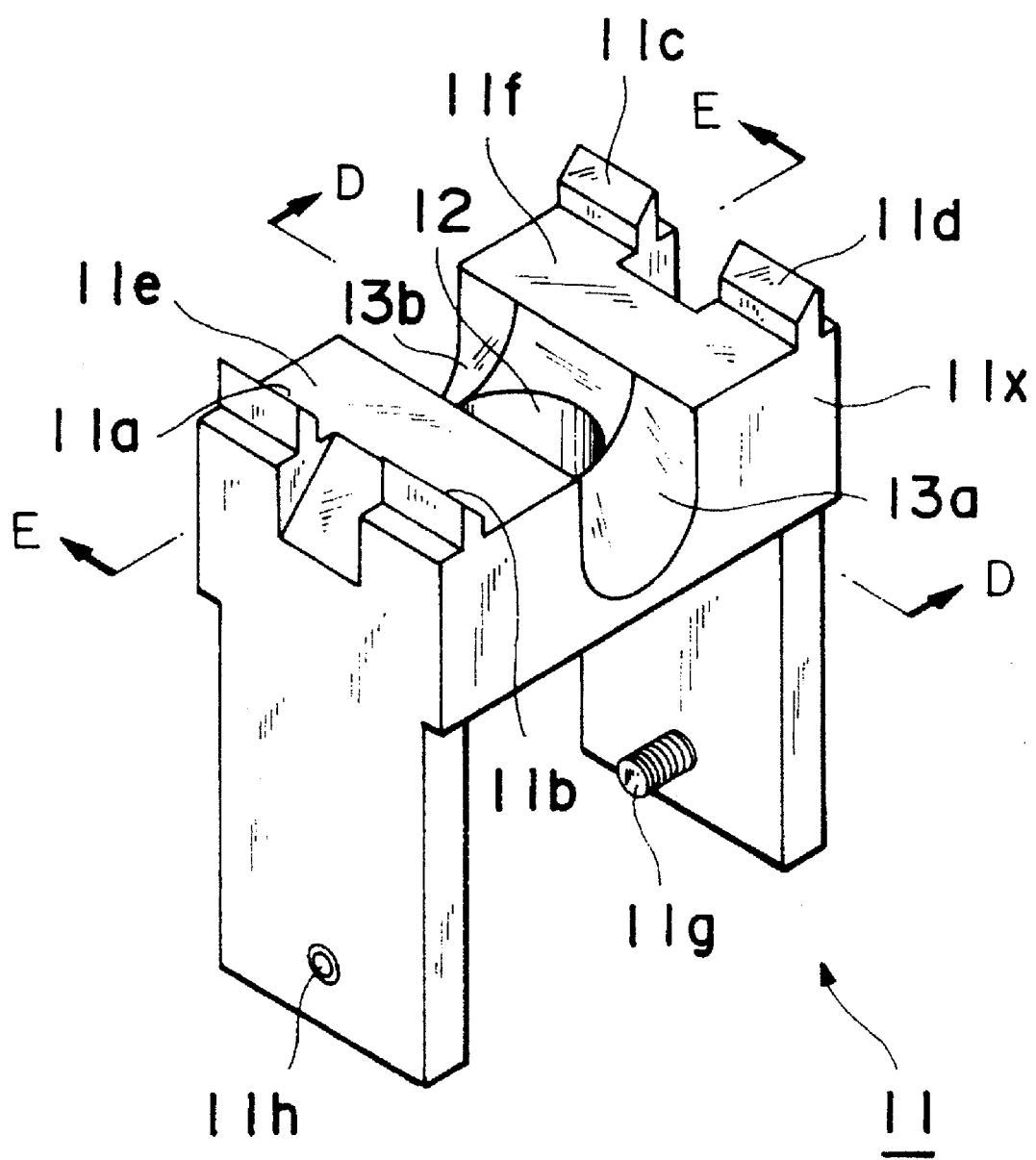
FIG. 6 is a perspective view showing a fiber presser component 11 to be used in the present apparatus. The fiber presser component 11 comprises components 11a, 11b, 11c, 11d. The fiber presser component 11 comprises surfaces 11e, 11f. The optical fibers are pressed into the V-shaped grooves 2a, 2b as the optical fibers are in contact with the surfaces 11e, 11f. The component 11 comprises set screws 11g, 11h.
Figure 7:
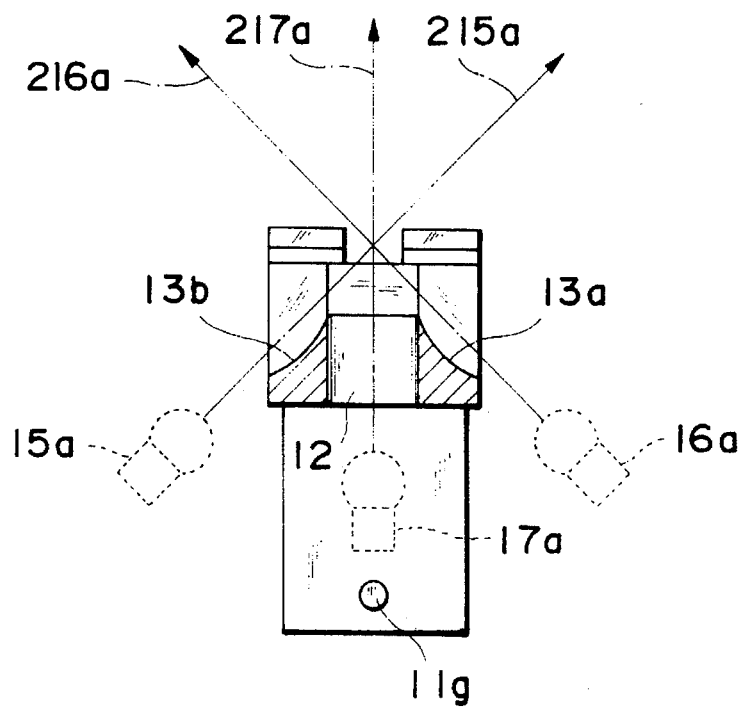
FIG. 7 is a view of the cross section D—D of the component 11 shown in FIG. 6. The component 11 comprises a through hole 12 through which light passes. The component 11 has U-shaped grooves 13a, 13b through which light passes.
Figure 8:
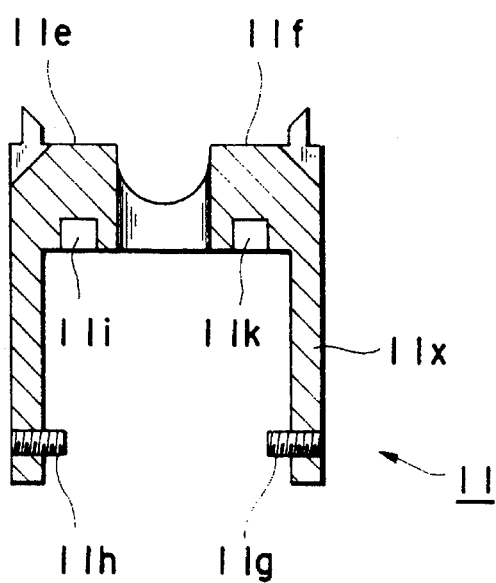
FIG. 8 is a view of the cross section E—E of the component 11 shown in FIG. 6. The component 11 has spring holes 11i, 11k.

FIG. 6 through FIG. 8 show a component 11 for pressing the fibers. The fiber presser component 11 comprises a fiber presser member 11 made of resin and set screws 11g and 11h attached to the member 11. The fiber presser member 11x has a surface 11e facing to the V-shaped groove 2a and a surface 11f facing to the V-shaped groove 2b. The fiber presser member has protrusions 11a, 11b, 11c, 11d. The fiber support member 2 is to be located between the protrusions 11a and 11c, and also the fiber support member 2 is to be located between the protrusions 11b and 11d. Accordingly, when the support member 2 is positioned between the protrusions 11a and 11c, the fiber presser member 11x is not moved with respect to the fiber support member 2. At this point, the surface 11e is located above the V-shaped groove 2a, so that the first fiber, not shown, is pressed into the V-shaped groove 2a, and the surface 11f is located above the V-shaped groove 2b, so that the second fiber, not shown, is pressed into the V-shaped groove 2b.

The component 11 has a through hole 12 through which light passes. The component 11 also has U-shaped grooves 13a, 13b. Light passes through the U-shaped grooves 13a, 13b. That is, first light 215a emitted from an LED (first light source) 15a passes through the U-shaped groove 13b, and second light 216a emitted from an LED (second light source) 16a passes through the U-shaped groove 13a. Third light 217a emitted from an LED (third light source) 17a passes through the through hole 12 (see FIG. 7).

Figure 9:
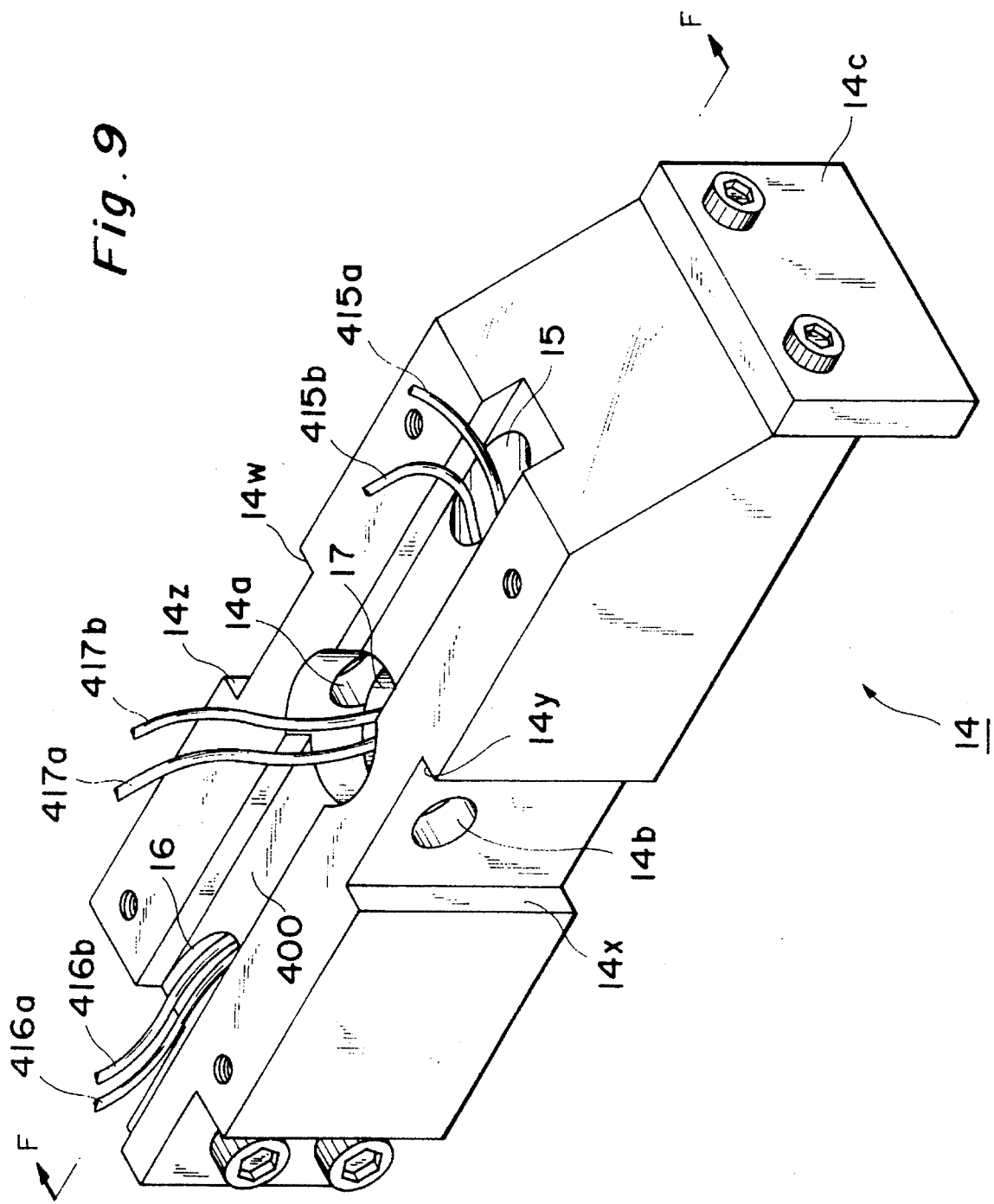
FIG. 9 is a perspective view showing an LED holder 14. The holder 14 has through holes 14a, 14b in which set screws 11g, 11h are to be placed, and through holes 15, 16, 17 in which LEDs 15a, 16a, 17a are to be placed. There is an iron plate 14c attached to the end of the holder 14.
Figure 10:
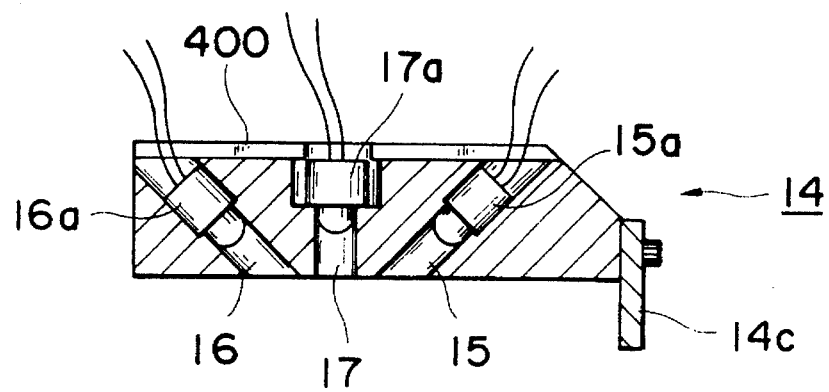
FIG. 10 is a view of the cross section F—F of the holder 14 shown in FIG. 9. The LED 15a is fixed at the inner wall of the through hole 15. The LED 16a is fixed at the inner wall of the through hole 16. The LED 17a is fixed at the inner wall of the through hole 17.
Figure 12:
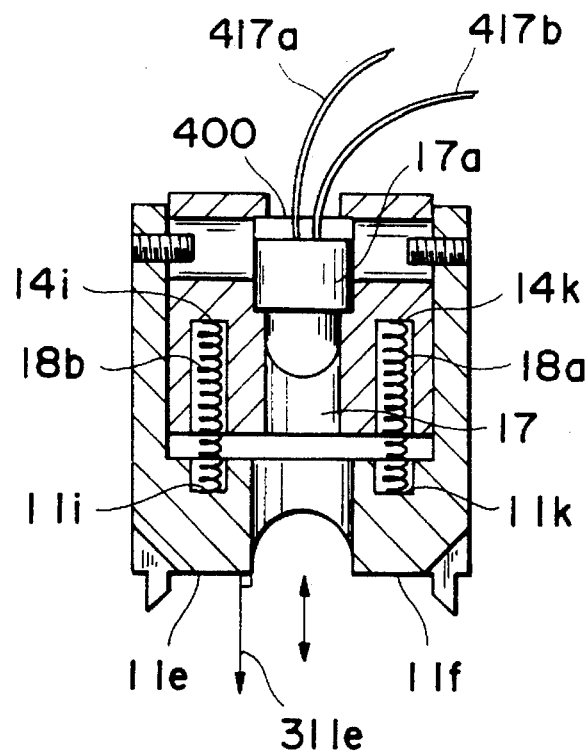
FIG. 12 is a view of the cross section G—G of the component shown in FIG. 11. The holder has a spring hole 14k in which the spring 18a is to be placed, and a spring hole 14i in which the spring 18b is to be placed.
Figure 11:
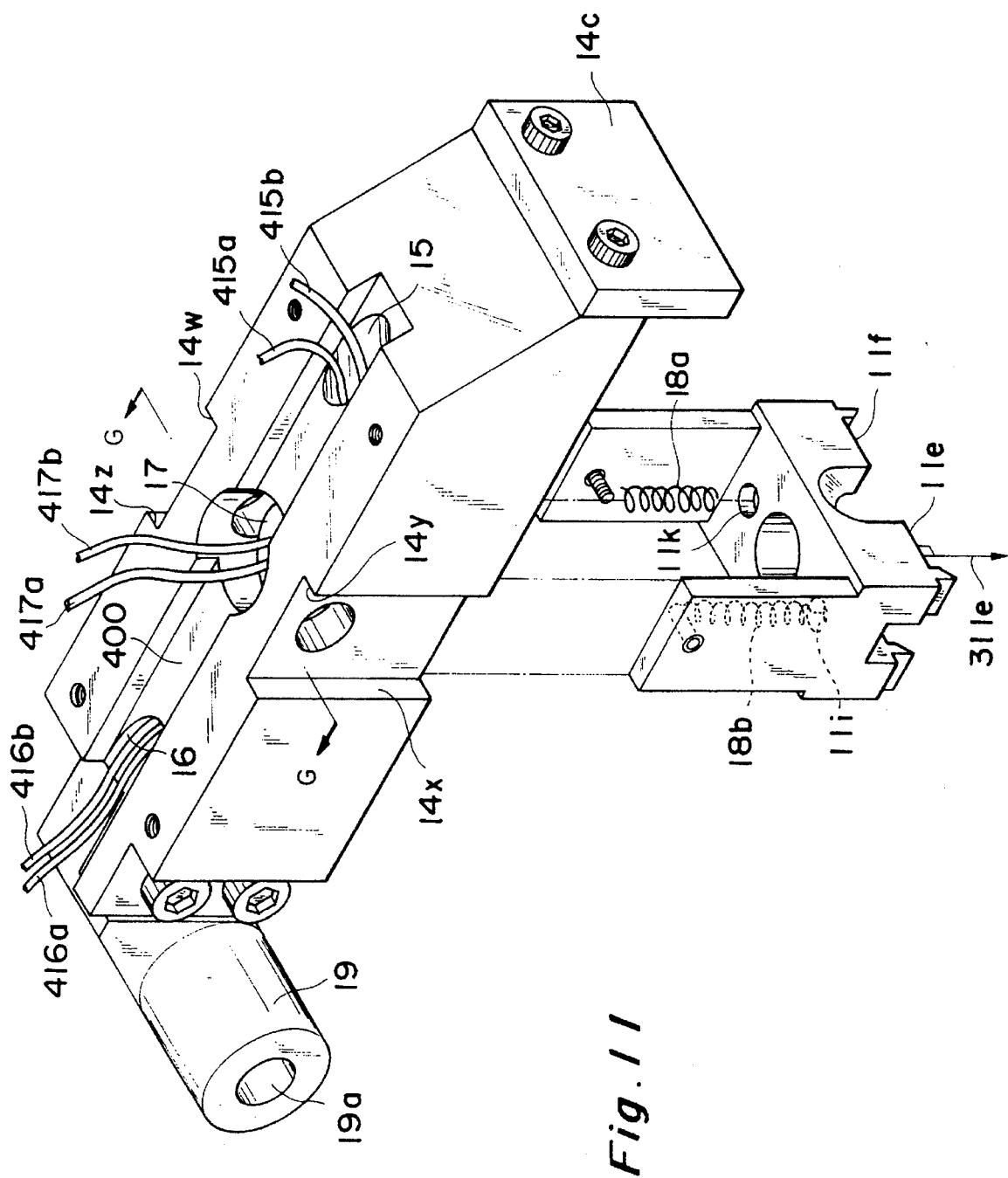
Figure 13:
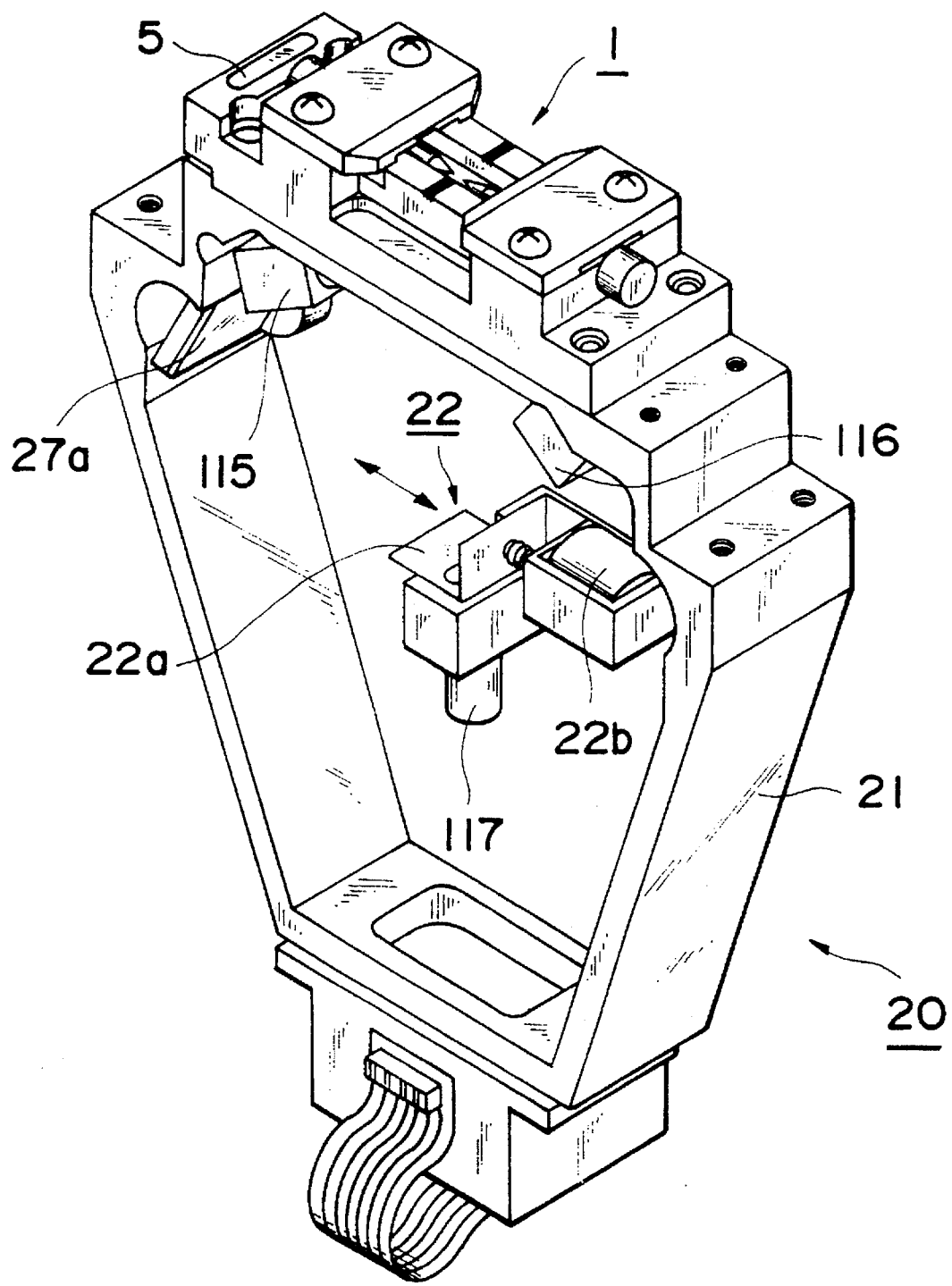
FIG. 13 is a perspective view of the support member 1 shown in FIG. 5 and a microscope unit 20. The microscope unit 20 comprises a housing 21.

FIG. 9 through FIG. 12 show an LED holder 14 and the fiber presser member 11. The fiber presser member 11x has spring holes 11i, 11k. The LED holder 14 has through holes 14a, 14b in which screws 11g and 11h are to be placed. The diameter R mm of the through hole 14a is larger than the diameter r mm of the set screw 11g. Accordingly, the fiber presser member 11x is moved within (R−r) mm in respect to the holder 14. The fiber presser member 11x is moved only in a direction parallel to a normal 311e of the surface 11e thereof in respect to the holder 14. The cross section E—E of the fiber presser member 11x is substantially U-shaped. Accordingly, the holder 14 placed in the U-shaped portion is not moved in a direction from G to G (direction GG). The movement of the holder 14 perpendicular to the normal 311e of the surface 11 and perpendicular to the direction GG is limited by steps 14x, 114y or steps 14z, 14w. The holder 14 has through holes 15, 16, 17 in which LEDs 15a, 16a, 17a are to be placed. There is an iron plate 14c attached on the tip of the holder 14. The magnet 5 attracts the iron plate 14c. The LED 15a is fixed at the inner wall of the through hole 15. The LED 15a has two lead wires 415a, 415b. The LED 16a is fixed at the inner wall of the through hole 16. The LED 16 has two lead wires 416a, 416b. The LED 17a is fixed at the inner wall of the through hole 17. The LED 17 has two lead wires 417a, 417b. The holder 14 has a groove 400 in which the lead wires 415a, 415b, 416a, 416b, 417 a, 417b are to be placed. In FIG. 9, the lead wires 416a, 416b are placed in the groove 400. There is a space between a cover member 23 and the lead wire 416a, which makes the life of the lead wires 415a, 415b, 416a, 416b, 417a, 417b longer.

There are compression springs 18a, 18b interposed between the holder 14 and the member 11. There is an arm 19 attached to the holder 14. The arm 19 has a through hole 19a. The holder has a spring hole 14k in which the spring 18a is to be placed, and a spring hole 14i in which the spring 18b is to be placed. The springs 18a, 18b draw the fiber presser member 11x towards the normal 311e of the surface 11e. In other words, the fiber presser member 11x receives a force in a direction separating from the holder 14 by the springs 18a, 18b.

FIG. 13 through FIG. 16 show an apparatus AP comprising the support member 1, a microscope unit 20, the LED holder 14 and a cover member 23.

The micro scope unit 20 comprises a housing 21. The housing 21 contains a first microscope 115, a second microscope 116, and a third microscope 117. The first microscope 115 is fixed at the inner wall 21b of the housing 21 with a support member 115x. The second microscope 116 is fixed at the inner wall 21b of the housing 21 with a support member 116x. The third microscope 117 is fixed at the inner wall 21b of the housing 21 with a support member 117x.

There is a shutter 22a placed between the microscope 117 and the support member 1. A shutter mechanism 22 has a shutter plate 22a for shielding light, and an electromagnet 22b connected to the plate 22a. The open and close of the shutter 22a are controlled by controlling the current flowing through the electromagnet 22b. This control is conducted by a system controller 701.

Inside the through hole 19a of the arm 19, a shaft 19b penetrates. The holder 14 moves around the shaft 19b. The holder 14 moves in directions shown by an arrow R1 of FIG. 14 with respect to the housing 21. A cutout switch SW1 is attached to the microscope unit 20 over a base 24.

There are plane mirrors 27a, 27b arranged in the housing 21. Beams 215, 216, 217 intersect at a point X on a surface of a CCD image sensor. When the cover member 23 is closed, the tip 23a of the cover member 23 is in contact with the switch SW1, and then the switch 1 is ON. At this point, the magnet 5 is in contact with the iron plate 14c. The switch SW1 has two lead wires 25a, 25b.

Note that the inner wall of the housing 21 is black. The housing 21 is made of resin which color is black. When the fibers F1 and F2 are observed with the microscopes 115, 116, 117, the inner wall of the housing 21 is preferably black. Because the black color absorbs undesired light entering in the housing, a clear image of the fiber is observed.

There is a transparent plate TR is provided between the third light source 17a and the third microscope 117. The housing 21 has a through hole 21t. The transparent plate TR covers the through hole 21t of the housing 21. Therefore, the dust hardly enters in the housing 21 from the outside.

An optical axis 215a of the first microscope 115 and a normal N1 of the first mirror 27a make an angle of A1. Let a point of intersection where the optical axis 215a of the first microscope 115 intersects with the first mirror 27a be "P". A line 215b connecting between the point P and the image sensor 28, and the normal N1 of the first mirror 27a make an angle of A2. The angle A1 is equal to the angle A2.

An optical axis 216a of the second microscope 116 and a normal N2 of the second mirror 27b make an angle of B1. Let a point of intersection where the optical axis 216a of the second microscope 116 intersects with the second mirror 27b be "Q". A line 216b connecting between the point Q and the image sensor 28, and the normal N2 of the second mirror 27b make an angle of B2. The angle B1 is equal to the angle B2.

The optical axis 217b of the third microscope 117 passes through the image sensor 28. The shutter 22a is provided between the third light source 17a and the third microscope 117. When the first light source 15a is turned on, the first light 215a enters the first microscope 115 and emerges towards the first mirror 27a. The first light 215a is reflected by the first mirror 27a and changed in the traveling direction. The first light 215b is focused on the image sensor 28. At this point, the shutter 22a is closed, which hinders the first light 215a to be incident on the third microscope 117 when the first light source 15a is turned on.

When the second light source 16a is turned on, the second light 216a enters the second microscope 116 and emerges towards the second mirror 27b. The second light 216a is reflected by the second mirror 27b and changed in the traveling direction. The second light 216b is focused on the image sensor 28.

When the third light source 17a is turned on, the shutter 22a is opened. The third light 217b is focused on the image sensor 28.

Figure 17:
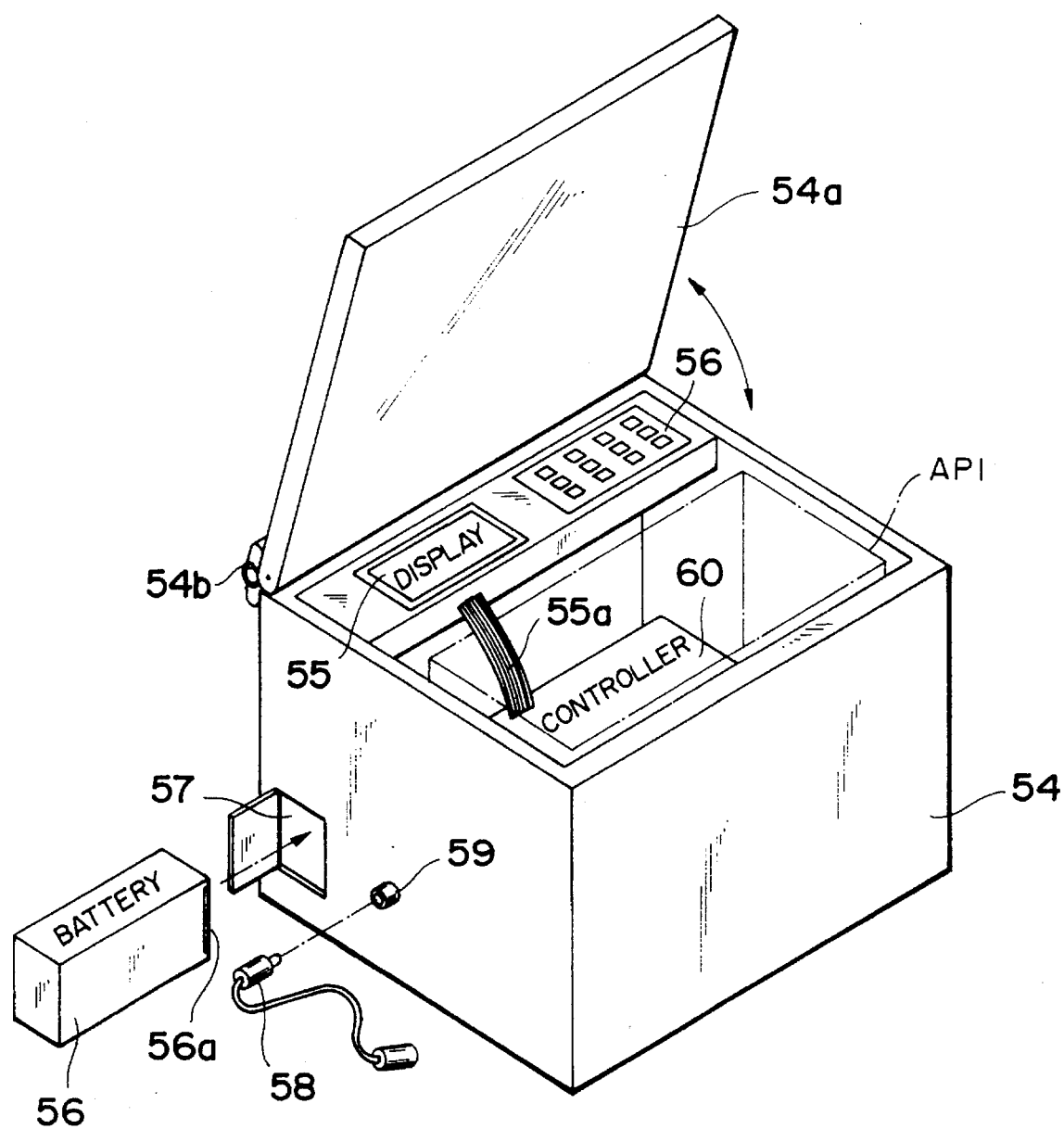
FIG. 17 is a perspective view of a fiber splicing apparatus. There are the apparatus AP1 shown in FIG. 16 and a controller 60 arranged in an external housing 54. The lid 54a is placed on the external housing 54 with a hinge 54b. When the lid 54a is opened, a liquid crystal display 55 is seen. When the lid 54a is closed, the display 55 is protected. This apparatus comprises input keys 56. Power is supplied from a battery 56 to this apparatus. The battery 56 is placed in a battery case 57 located in the external housing 54. There is a terminal 59 to which a cigarette adaptor 58 is connected on the external housing 54.

FIG. 17 is a perspective view of the fiber splicing apparatus. The apparatus AP1 shown in FIG. 16, and the controller 60 are provided in an external housing 54. A lid 54a is attached to the external housing 54 with a hinge 54b. When the lid 54a is opened, a liquid crystal display 55 is seen. When the lid 54a is closed, the display 55 is protected. This apparatus comprises a console panel 56 with a plurality of input keys 56. Power is supplied from a battery 56 to the apparatus. The battery 56 is placed in a battery case 57. The battery case 57 is placed in the external housing 54. The external housing 54 has a terminal 59 attached to which a cigarette adapter 58 is to be connected. The display 55 and the console panel 56 are connected to the controller 60 through a cord 55a.

The cover member 23 covers the first discharge electrode 4 and the second discharge electrode 7. The cutout switch SW1 is turned on when the cover member 23 covers the first discharge electrode and the second discharge electrode 7. Accordingly, when the cover member 23 is opened, the discharge is not generated between the discharge electrode 4 and the discharge electrode 7.

Figure 18:
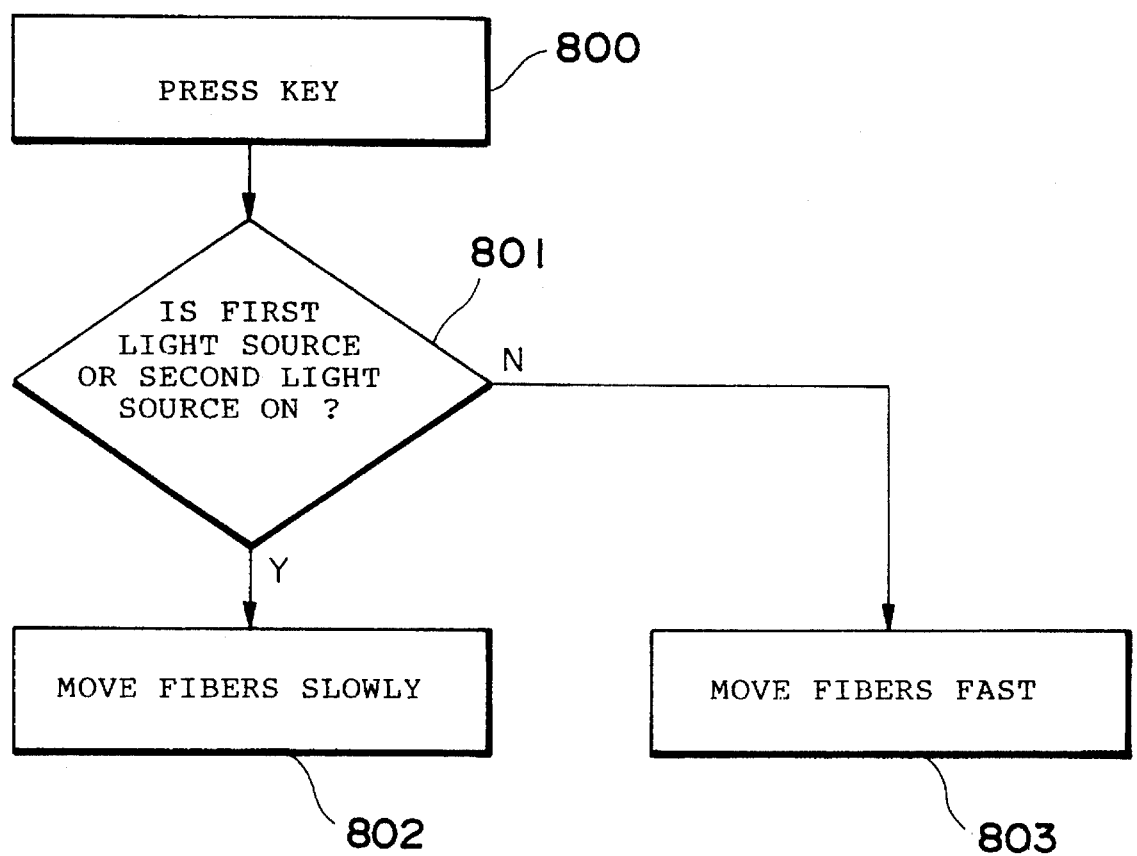
FIG. 18 is a flowchart illustrating a process of the present embodiment.

FIG. 18 is a flowchart illustrating a process of the present embodiment.

Figure 14:
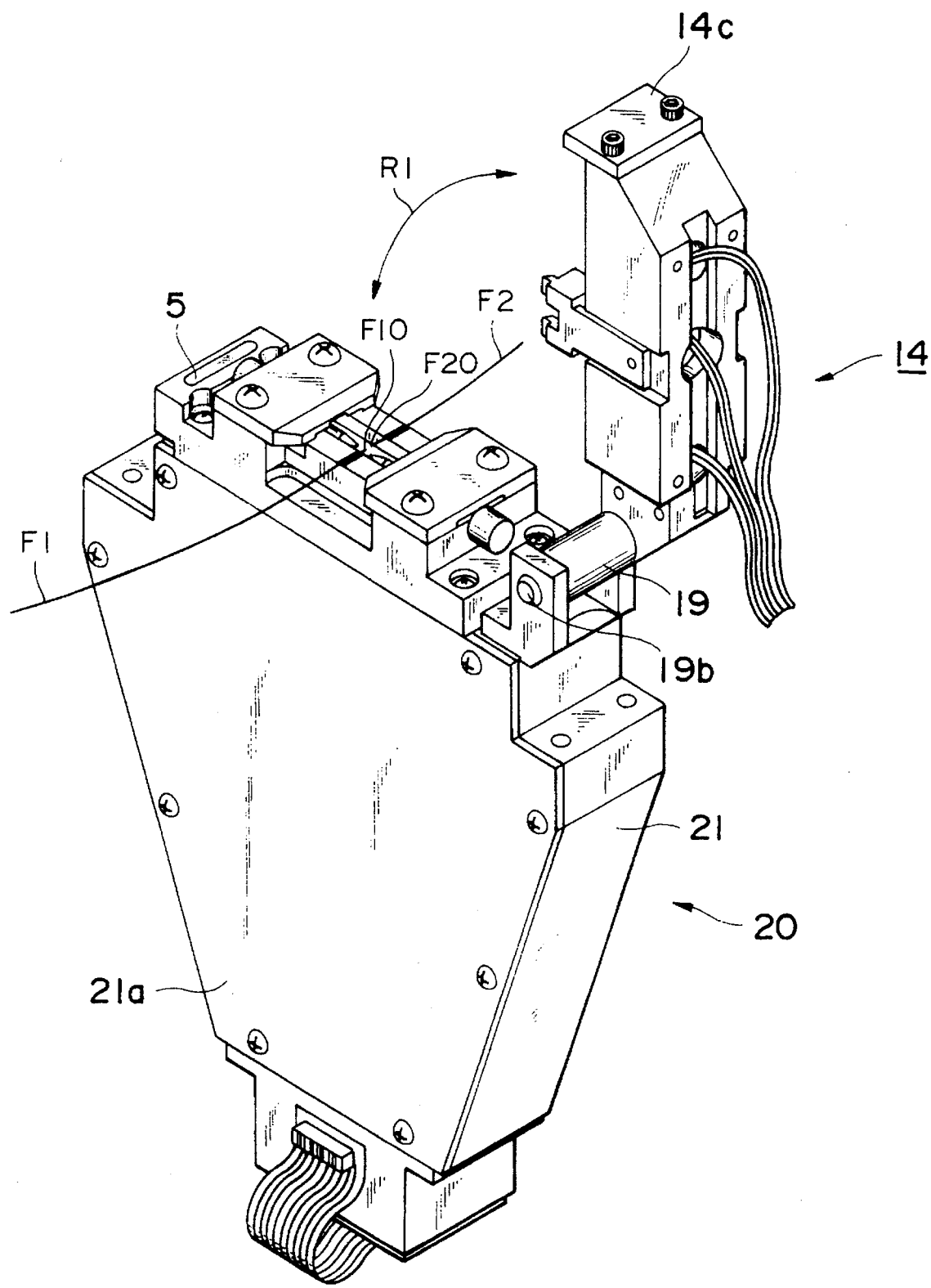
FIG. 14 is a view of the component shown in FIG. 11 attached to the unit 20 shown in FIG. 13. The side plate 21a is put on the housing 21. There is a shaft 19b penetrating the through hole 19a of the arm 19. The holder 14 is moved around the shaft 19b.
Figure 15:
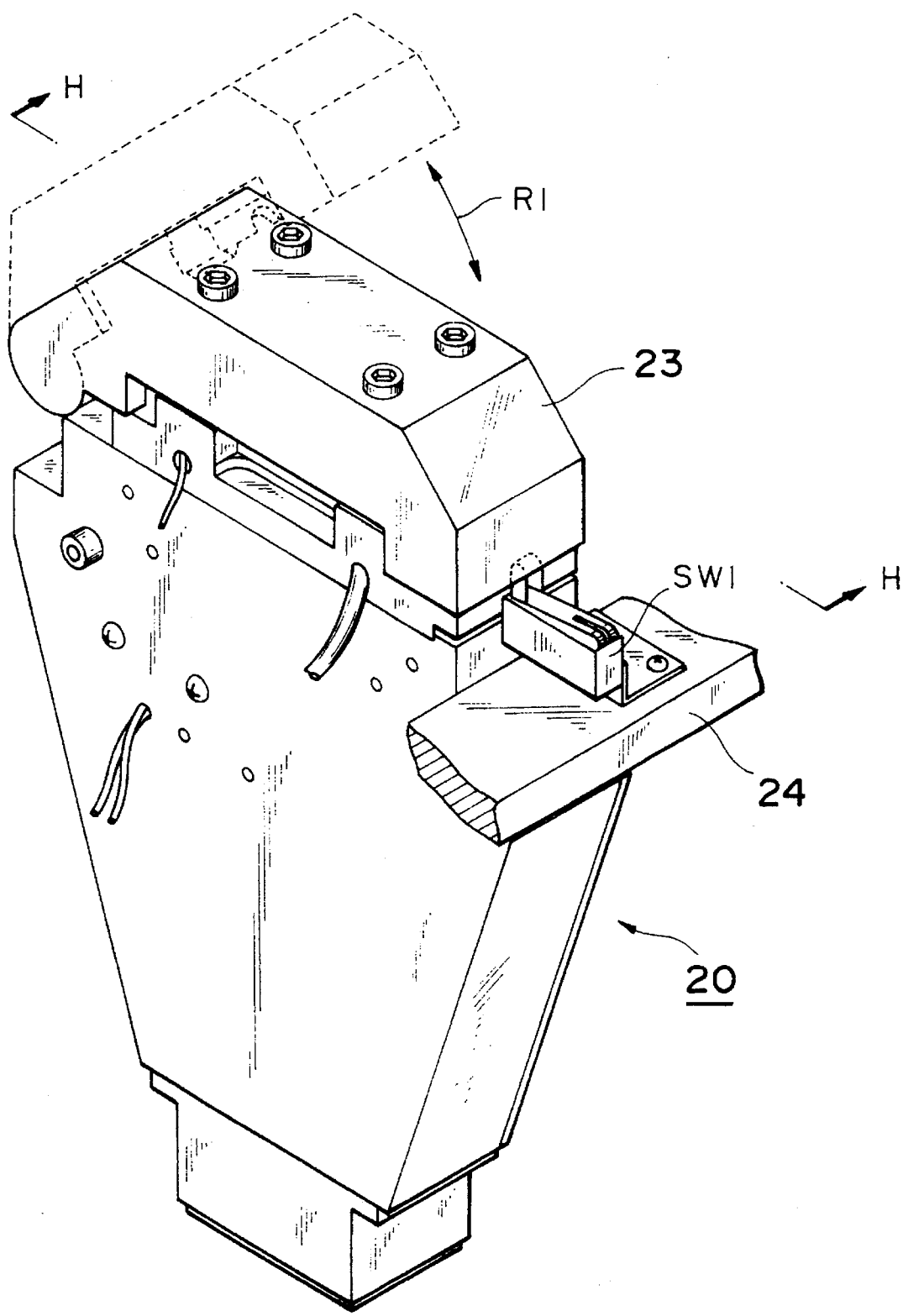
FIG. 15 is a view of a cover member 23 put on the holder 14 shown in FIG. 14. The switch SW1 is attached to the microscope unit 20 over a base 24.
Figure 16:
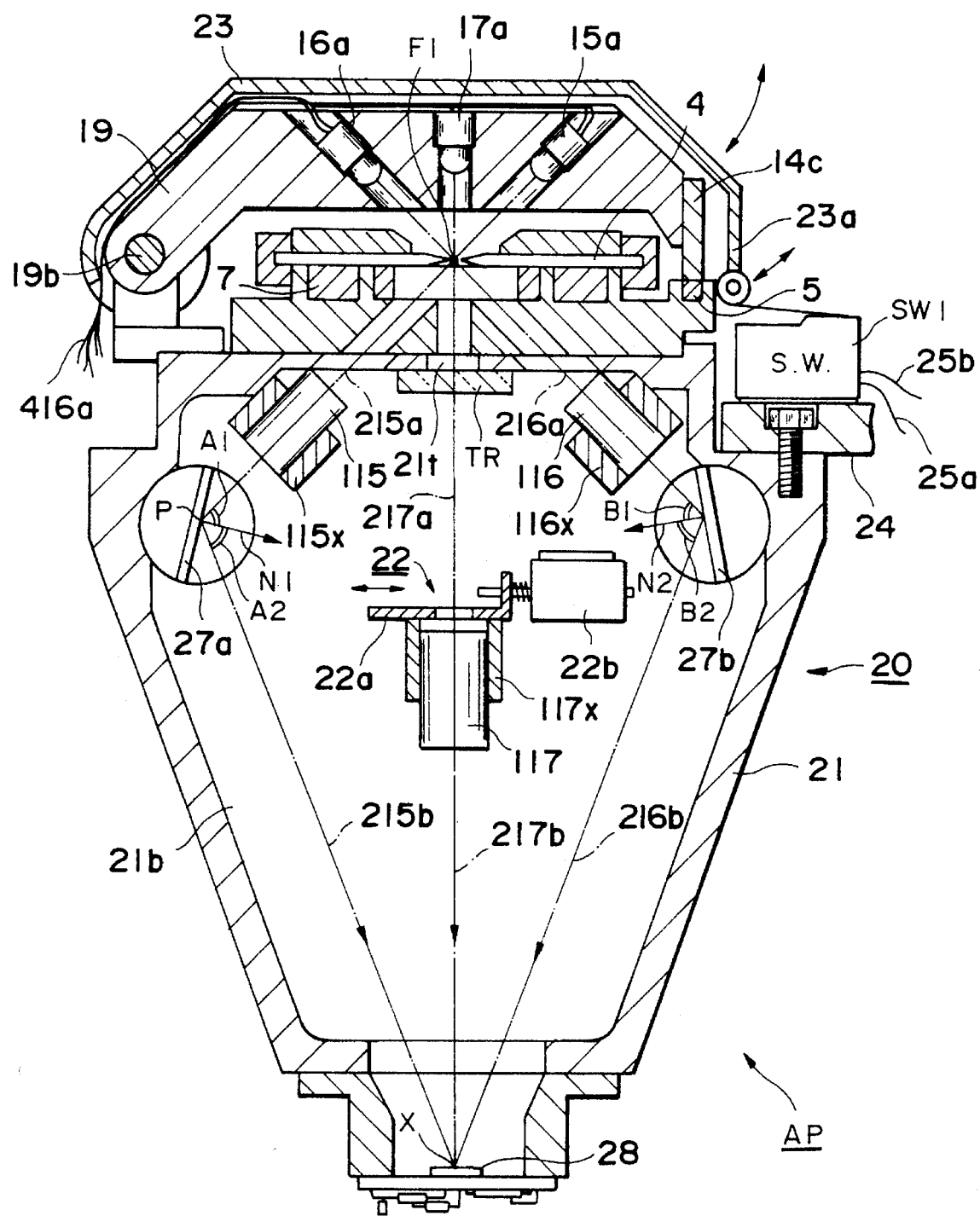

A method for connecting or splicing the first fiber F1 with the second fiber F2 will be described (see FIG. 14). The first fiber F1 has a first end (end face) F10, and the second fiber F2 has a second end (end face) F20.

To splice these fibers F1 and F2, first, the first end F10 is placed facing to the second end F20.

Then, the fibers F1 and F2 are moved so that the distance between the first end F10 and the second end F20 is above 3 mm and below 1 cm.

Next, the third light source 17a is turned on. Successively, the first end F10 is made closer to the second end F20 at a first speed (0.3 mm/sec) while the first and second optical fibers F1 and F2 are being observed with the microscope 117.

As the third light source 17a is turned on, the third light 217a emitted from the third light source 17a irradiates the optical fibers F1 and F2. The third light 217a is transmitted in the optical fibers F1 and F2. The third light transmitted in the optical fibers F1 and F2 is transmitted in the third microscope 117. Accordingly, when the third light source 17a is turned on, the enlarged images of the optical fibers F1 and F2 are observed from a third direction (direction of the optical axis 217b of the microscope 117) by looking them through the third microscope 117. The magnification factor (the third magnification:×50) of the third microscope 117 is lower than the magnification factor (the first magnification:× 100) of the first microscope 115. The magnification factor (the third magnification) of the third microscope 117 is lower than the magnification factor (the second magnification:×100) of the second microscope 116.

When the first fiber is connected with the second fiber, the ends F10 and F20 are made to be faced each other by looking the first fiber F1 and the second fiber F2 with eyes. As described above, after the fibers F1 and F2 are sufficiently made closer (above 3 mm and below 1 cm), the fibers F1 and F2 are observed at the third magnification factor using the third microscope 117. Because the third magnification factor (×50) is lower than the first magnification factor (×100), the end faces of the fibers F1 and F2 are resiliently found in a sight of the third microscope 117.

While the first and second fibers F1 and F2 are being taken by the CCD image sensor 28, and the pictures are being displayed on the display 55, one of the keys 56 is pressed.

When the first light source 15a or the second light source 16a is off (Step 801), if one of the keys 56 is pressed, the first end F10 is made closer to the second end 20 (greater than 1 mm and less than 3 mm).

Next, the fibers F1 and F2 are observed with the first microscope 115. The third light source 17a is turned off and the first light source 15a is turned on. The switch over of the light source is made by pressing one of the keys 56.

While the third light source 17a is on, the shutter 22a is opened. While the first light source 15a or the second light source 16a is on, the shutter 22a is closed.

The magnification factor of the first microscope 115 is higher than the magnification factor of the third microscope 117. The fibers F1 and F2 to be seen are large with the first microscope 115 as compared with the case of the third microscope 117. While the fibers F1 and F2 are being observed with the first microscope 115, the end faces F10 and F20 are moved towards each other at a second speed (0.1 mm/sec) to be more closer (greater than 1 µm and less than 1 mm).

In other words, while the first and second fibers F1, F2 are being taken by the CCD image sensor 28 and the pictures are being displayed on the display 55, one of the keys 56 is pressed to make the fibers F1, F2 closer.

While the first light source 15a or the second light source 16a is being on (Step 801), if one of the keys 56 is pressed (Step 800), the first end F10 is more closer to the second end F20 (greater than 1 µm and less than 1 mm) at second speed.

The second speed (0.1 mm/sec) is lower than the first speed (0.3 mm/sec). When the fibers F1 and F2 are close enough, the axes of the cores of the fibers F1 and F2 are aligned by looking the fibers F1 and F2 from the first direction (the direction of the optical axis 215a of the first microscope 115). That is, the fibers F1 and F2 are moved so that the optical axes of the cores (not shown) match.

Next, the fibers F1 and F2 are observed with the second microscope 116. The first light source 15a is turned off, and the second light source 16a is turned on. The switch over of the light source is made by pressing one of the keys 56. While the third light source 17a is being on, the shutter 22a is opened. While the first light source 15a or the second light source 16a is being on, the shutter 22a is closed. The shutter 22a is controlled by the controller 60.

The images (the second light 216a) of the fibers F1 and F2 are observed with the second microscope 116. The magnification factor (×100) of the second microscope 116 is higher than the magnification factor (×50) of the third microscope 117. The fibers F1 and F2 to be seen are large with the second microscope 116 as compared with the case of the third microscope 117.

While the fibers F1 and F2 are being observed with the second microscope 116, the end faces F10 and F20 are moved towards each other at a second speed (0.1 mm/sec). The axes of the cores F1 and F2 of the fibers F1 and F2 are aligned by looking the fibers F1 and F2 from the second direction (the direction of the optical axis 216a). That is, the fibers F1 and F2 are moved so that the optical axes of the cores match. Therefore, the fibers are aligned by looking them from two directions.

After the first and second fibers F1 and F2 are aligned, the fiber F1 is connected with the fiber F2. Before the fiber F1 is connected with the fiber F2, the first voltage (3 kV–6 kV) is applied between the first discharge electrode 4 and the second discharge electrode 7 which are located near the end faces of the fibers F1 and F2. The voltage is supplied to the electrodes 4, 7, form a circuit (not shown). The duration of applying the first voltage to the discharge electrodes 4, 7 is a first period. The first period is greater than 0.01 seconds and less than 0.5 seconds. More particular, the first period is preferably 0.1 seconds. During the first period, when the first voltage is applied to the discharge electrodes 4, 7, the dusts attached to the surfaces of the fibers F1 and F2 are blown away. Therefore, the fibers F1 and F2 are cleaned.

Next, the second voltage (3 kV–6 kV) is applied between the first discharge electrode 4 and the second discharge electrode 7. The duration of applying the second voltage to the discharge electrodes 4, 7 is a second period. The second period is greater than 1 second and less than 7 seconds. When fibers to be connected together are single-core fibers, the second period is 1 second to 2 seconds. In this case, the second period is preferably 1.5 seconds. When fibers to be connected together are multi-fiber cables, that is, ribbon 8-fiber cables, the second period is preferably greater than 4 seconds and less than 6 seconds.

When the second voltage is applied between the discharge electrodes, the ends of the first fiber and the second fiber are melted by the discharge. As the melted ends are solidified, the first fiber is connected with the second fiber while they are aligned.

During discharging, the first discharge electrode 4 and the second discharge electrode 7 are covered with the cover member 23. This is because the first discharge electrode 4 and the second discharge electrode 7 are not to be touched. The first and second discharge electrodes 4, 7 are connected to the discharge circuit (not shown). The first switch SW1 is connected between the discharge circuit and the discharge electrode 7. The first switch SW1 is turned on when the cover member 23 covers the first discharge electrode 4 and the second discharge electrode 7. The first switch SW1 is turned off when the cover member 23 does not cover the first discharge electrode 4 and the second discharge electrode 7. When a discharging switch (not shown) is turned on for discharging, and the cover member 23 does not cover the first discharge electrode 4 and the second discharge electrode 7, the discharging is not started because the first switch SW1 is off. When the discharging switch (not shown) is turned on for discharging, and the cover member 23 covers the first discharge electrode 4 and the second discharge electrode 7, the discharging is started because the first switch SW1 is on.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 249975/1993 filed on Sep. 10, 1993 is hereby incorporated by reference.

What is claimed is:

1. An apparatus for melting optical fibers to splice the optical fibers, comprising:
   (a) a housing;
   (b) a first microscope placed in said housing to observe said optical fibers;
   (c) a first light source facing to said first microscope;
   (d) a second microscope placed in said housing to observe said optical fibers;
   (e) a second light source facing to said second microscope;
   (f) a third microscope placed in said housing to observe said optical fibers;
   (g) a third light source facing to said third microscope; and (h) a discharge electrode for melting said optical fibers.

2. An apparatus according to claim 1, wherein an optical axis of said first microscope and an optical axis of said second microscope make an angle of above 60 degrees and below 120 degrees.

3. An apparatus according to claim 1, wherein an optical axis of said first microscope and an optical axis of said second microscope make an angle of 90 degrees.

4. An apparatus according to claim 1, wherein a magnification factor of said third microscope is lower than that of said first microscope; and a magnification factor of said third microscope is lower than that of said second microscope.

5. An apparatus according to claim 1 further comprising a holder for holding said first light source, said second light source and said third light source.

6. An apparatus according to claim 5, wherein said holder is provided in said housing so as to be relatively movable with respect to said housing.

7. An apparatus according to claim 1, further comprising a terminal to which a cigarette adapter is connected for supplying power to said first light source, said second light source and said third light source.

8. An apparatus according to claim 1, further comprising:

a cover member for covering over said discharge electrode; and a first switch being on while said cover member covers over said discharge electrode.

9. An apparatus according to claim 1, wherein an inner wall of said housing is black.

10. An apparatus according to claim 1 further comprising a transparent plate placed between said third light source and said third microscope.

11. An apparatus according to claim 1 further comprising a transparent plate placed between said third light source and said third microscope and covering a through hole formed in said housing.

12. An apparatus according to claim 1 further comprising:

a first mirror placed in said housing;

a second mirror placed in said housing; and an image sensor placed in said housing.

13. An apparatus according to claim 1 further comprising:

an image sensor placed on an optical axis of said third microscope in said housing;

a first mirror placed in said housing so that an angle of a normal of said first mirror and an optical axis of said first microscope is equal to an angle of a line connecting between a point of intersection of said first mirror and the optical axis of said first microscope and the normal of said first mirror; and a second mirror placed in said housing so that an angle of a normal of said second mirror and an optical axis of said second microscope is equal to an angle of a line connecting between a point of intersection of said second mirror and the optical axis of said second microscope and the normal of said second mirror.

14. An apparatus according to claim 1 further comprising a shutter placed between said third light source and said third microscope.

15. An apparatus according to claim 1 further comprising:

a shutter placed between said third light source and said third microscope; and a controller for controlling said shutter so that when said first light source is turned on, said shutter is closed, and when said third light source is turned on, said shutter is opened.

16. An apparatus according to claim 1 further comprising an external housing for storing said housing.

17. An apparatus according to claim 1 further comprising:

an external housing for storing said housing; and an external cover member placed at said external housing so as to be rotatable, said external cover member covering said housing when it is closed.

18. An apparatus according to claim 1 further comprising:

an external housing for storing said housing; and a battery case placed in said external housing.

19. An apparatus for splicing optical fibers comprising:

(a) a power supply;

(b) a first light source electrically connected to said power supply;

(c) a first microscope arranged so that light emitted from said first light source enters said first microscope;

(d) a second light source electrically connected to said power supply;

(e) a second microscope arranged so that light emitted from said second light source enters said second microscope;

(f) a third light source electrically connected to said power supply;

(g) a third microscope arranged so that light emitted from said third light source enters said third microscope, said third microscope having a lower magnification factor than said first microscope; and (h) a discharge electrode for melting optical fibers.

20. A method for splicing a first optical fiber having a first end with a second optical fiber having a second end, said method comprising the steps of:

(a) facing said first end to said second end;

(b) irradiating a first light from a first light source to said first and second ends;

(c) observing the first light passing through the first and second ends with a first microscope;

(d) irradiating a second light from a second light source to said first and second ends;

(e) observing the second light passing through the first and second ends with a second microscope;

(f) irradiating a third light from a third light source to said first and second ends; and (g) observing the third light passing through the first and second ends with a third microscope; and (h) splicing said first end with said second end by melting the first and second ends.

21. A method according to claim 20, further comprising:

(i) moving said first end closer to said second end at a first speed while said first and second optical fibers are being observed with said first microscope; and (j) moving said first end closer to said second end at a second speed which is slower than said first speed while said first and second optical fibers are being observed with said second microscope.

* * * * *